(12) United States Patent
Hur et al.

(10) Patent No.: US 9,070,405 B2
(45) Date of Patent: Jun. 30, 2015

(54) SIGNAL NOISE REJECTION

(71) Applicant: Seagate Technology LLC, Cupertino, CA (US)

(72) Inventors: JungWook Hur, Suwon (KR); TaeYoung Kim, Seongnam (KR)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/041,172

(22) Filed: Sep. 30, 2013

(65) Prior Publication Data
US 2015/0092288 A1 Apr. 2, 2015

(51) Int. Cl.
H04B 15/00 (2006.01)
G11B 20/10 (2006.01)

(52) U.S. Cl.
CPC .............. G11B 20/10046 (2013.01)

(58) Field of Classification Search
None
See application file for complete search history.

(56) References Cited

U.S. PATENT DOCUMENTS 6,943,545 B2 * 9/2005 Patland et al. .............. 324/210
2013/0294210 A1 * 11/2013 Taratorin .................. 369/53.38

* cited by examiner

Primary Examiner — Paul Huber
(74) Attorney, Agent, or Firm — HolzerIPLaw, PC

(57) ABSTRACT

An implementation of a system disclosed herein provides a method of determining a frequency of baseline noise in a target or read sensor signal and rejecting a band of signals from the target or read sensor signal substantially around the frequency of the baseline noise, including devices to implement this method.

18 Claims, 7 Drawing Sheets

SIGNAL NOISE REJECTION

SUMMARY

An implementation of a system disclosed herein provides a method of determining a frequency of baseline noise in a read sensor signal and rejecting a band of signals from the read sensor signal substantially around the frequency of the baseline noise. An alternative implementation of the system disclosed herein provides a device including a baseline noise frequency detector configured to determine a baseline frequency of a reader baseline noise and a band rejection filter configured to reject the baseline noise.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

These and various other features and advantages will be apparent from a reading of the following detailed description.

BRIEF DESCRIPTIONS OF THE DRAWINGS

The described technology is best understood from the following Detailed Description describing various implementations read in connection with the accompanying drawings.

DETAILED DESCRIPTIONS

A storage device, such as a hard disc drive, enables users of computer systems to store and retrieve large amounts of data in a fast and efficient manner. A disc drive stores data on a disc in a large number of tracks, with each track divided into a number of sectors. These sectors can have varying sizes, including 512 and 4 K bytes among others, and the embodiments described here apply to these different sized sectors for reading data patterns or non-data patterns, like maintenance cylinder patterns. The transducer, in some embodiments, a Magneto Resistive (MR) transducer or head, used for reading the data and position signal from the disk can have one of several undesirable characteristics. Some of these undesirable characteristics include baseline shift, thermal asperity, baseline popping, and second harmonic distortion, among others. Each of these undesirable characteristics may cause errors in the position signal or the data signal read from the disk drive.

For example, baseline popping (BLP) and/or baseline line noise (BLN) may occur in the transducer. Specifically, BLP refers to time domain random noise spikes above the noise baseline, whereas BLN refers to high overall noise baseline. Both BLP and BLN are of large frequency bandwidth, generally ranging from KHz to GHz. The presence of the BLP and BLN adversely affect the signal to noise ratio and therefore the performance of the transducer. Furthermore, the BLP and BLN may also adversely affect reliability of the transducer.

An implementation of a system disclosed herein provides a method of determining a frequency of baseline noise in a read sensor signal and rejecting a band of signals from the read sensor signal substantially around the frequency of the baseline noise. An alternative implementation of disc drive disclosed herein provides a baseline signal noise (used to refer BLN, BLP, and combination thereof) detection and rejection module. Specifically, the baseline signal detection and rejection module includes a Fast-Fourier Transform (FFT) module including circuitry for characterization of the baseline signal noise and a band rejection filter module for rejecting the baseline signal noise using the characterization of the baseline signal noise.

Figure 1:
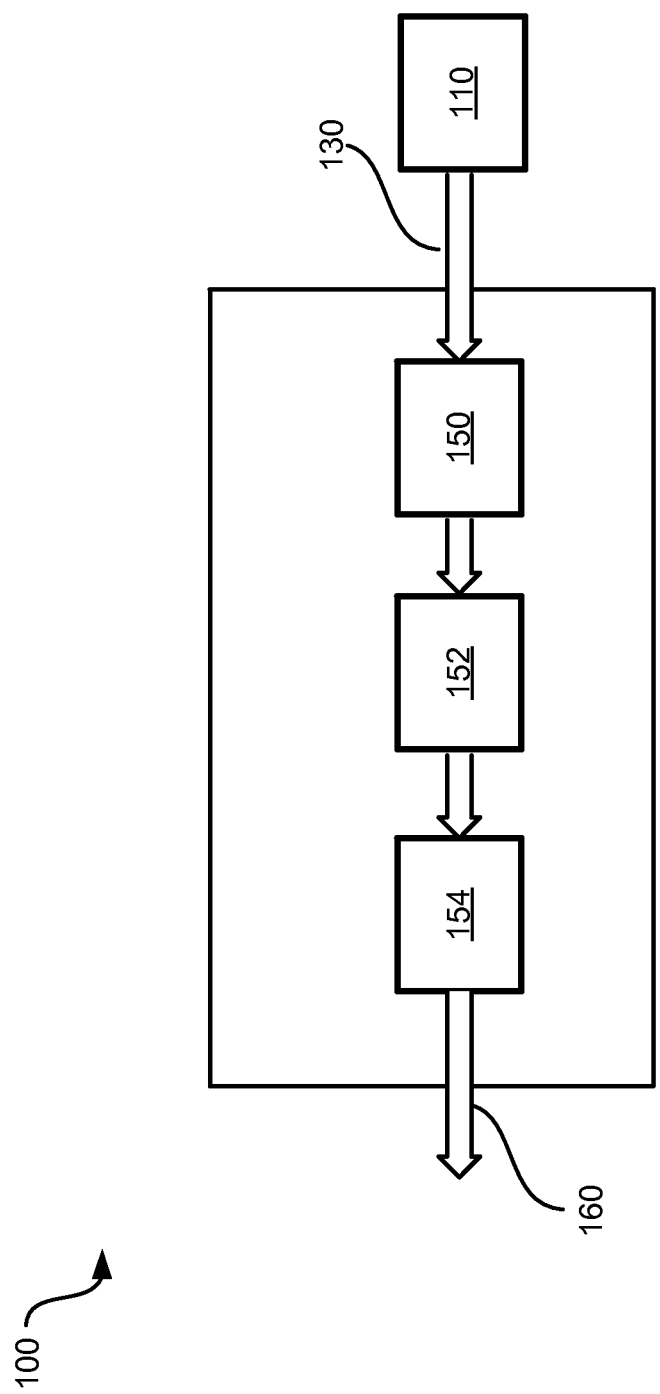
FIG. 1 illustrates example circuitry for baseline signal noise rejection.

FIG. 1 illustrates example circuitry 100 for baseline signal noise rejection from a target signal of a device 110. Specifically, the circuitry 100 includes a pre-amplifier module 150 for amplifying the baseline signal noise 130 generated by the device 110. The amplified baseline signal noise is input to a baseline signal noise characterization module 152 that characterizes the baseline signal noise. In one implementation, the baseline signal noise characterization module 152 determines the frequency of the baseline signal noise. For example, the baseline signal noise characterization module 152 may use an FFT circuit that determines the frequency of the baseline signal noise. A detailed description of the functioning of the baseline signal noise characterization module 152 is illustrated below in FIGS. 3 and 4. In one implementation, the output of the baseline signal noise characterization module 152 is converted to a value using an analog to digital converter (ADC). In such a case, the output of the ADC provides values that represent the frequency of frequency band of the baseline signal noise. Such values are stored in one or more registers, etc., such that they can be used later for processing of signal read from the device 110.

The signal output from the baseline signal noise characterization module 152 is input to a signal rejection module 154. For example, the signal rejection module 154 may be a band rejection filter that is controlled by the output of the baseline signal noise characterization module 152.

Thus, for example, if the baseline signal noise characterization module 152 determines that the baseline signal noise is represented substantially by a frequency band of 90-95 MHz, the signal rejection module 154 may filter the signal from the device 110 to remove the signal in this frequency band. As a result, the output 160 of the signal rejection module 154 is substantially without any baseline signal noise.

Figure 2:
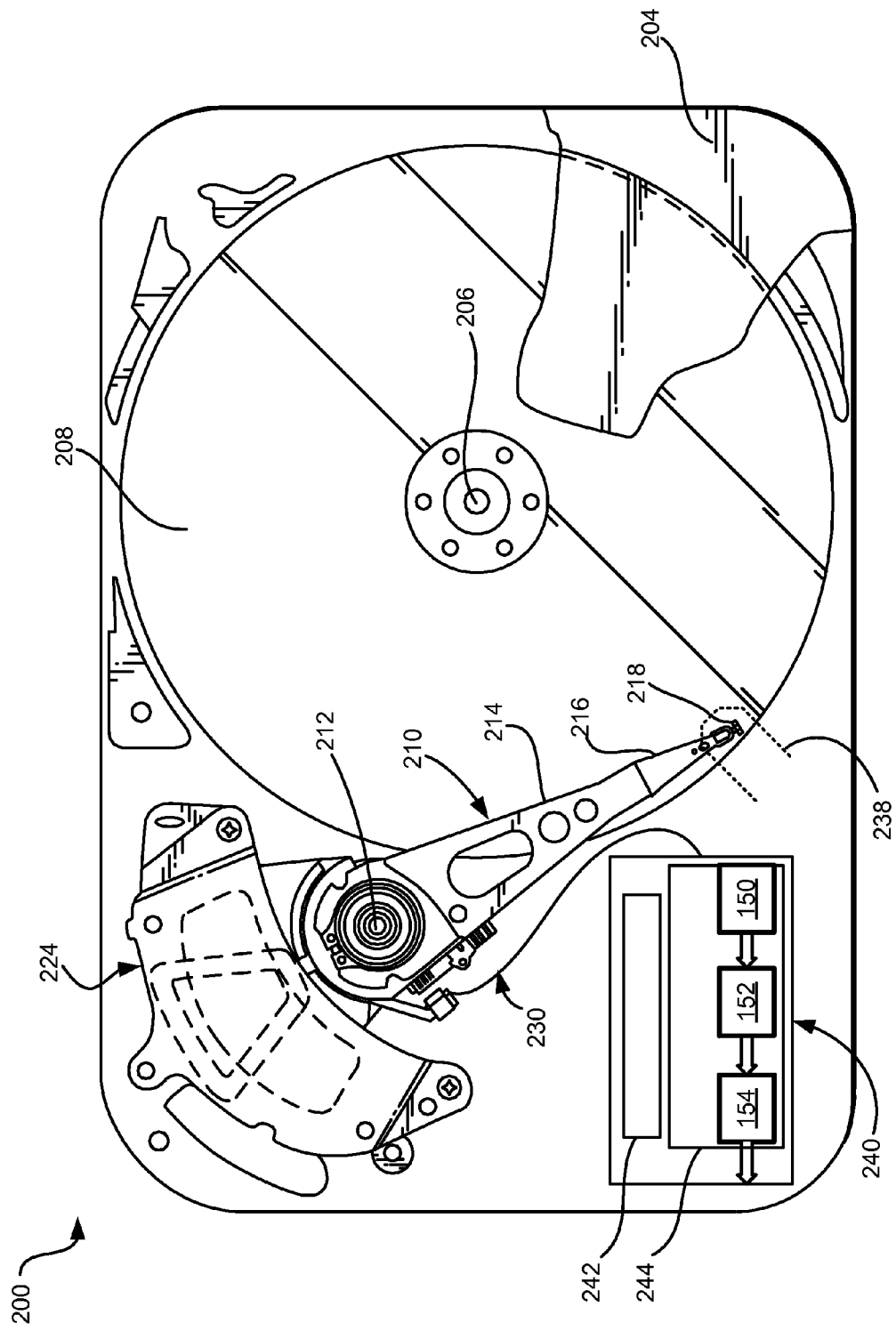
FIG. 2 illustrates a plan view of an example disc drive using baseline signal noise rejection.

FIG. 2 illustrates a plan view of a device such as an example disc drive 200 including a module for detecting and rejecting baseline signal noise from a target signal generated by the device. The device components include a spindle motor 206 that rotates one or more storage medium discs 208 at a constant high speed. Information is written to and read from tracks on the discs 208 through the use of an actuator assembly 210, which rotates during a seek operation about a bearing shaft assembly 212 positioned adjacent the discs 208. The actuator assembly 210 includes a plurality of actuator arms 214 that extend towards the discs 208, with one or more flexures 216 extending from each of the actuator arms 214. Mounted at the distal end of each of the flexures 216 is a head 218, which includes one or more transducers, that includes an air bearing slider enabling the head 218 to fly in close proximity above the corresponding surface of the associated disc 208. The distance between the head 218 and the storage media surface during flight is referred to as the "fly height".

During a seek operation, the track position of the head 218 is controlled through the use of a voice coil motor (VCM) 224. The actuator assembly 210 pivots about the bearing shaft assembly 212, and the transducer heads 218 are caused to move across the surfaces of the discs 208 as well as moved away from portions of the disk 208 containing data, such as to the off disc ramp 238.

When the disc drive 200 is not in use, the transducer head 218 may be located on a non-data zone, such as for example, the off-disc ramp 238 of the disc drive 200, it may be off the media surface of the discs 208, or it may be otherwise moved away from portions of the disk 208 containing data (such as a landing zone or non-data zone). At this position, a read sensor of the transducer head 218 does not receive any signal from the media of the discs 208. Therefore, if the read sensor of the transducer head 218 picks up any signal, such signal is potentially the baseline signal noise.

A flex cable 230 provides the requisite electrical connection paths for the actuator assembly 210 while allowing pivotal movement of the actuator assembly 210 during operation. In the implementation of the disc drive 200, the flex cable 230 is connected to a disc drive circuit module 240 that processes the signal from the transducer head 218 communicated through the flex cable 230. The disc drive circuit module 240 includes circuitry 242 for controlling the write currents applied to the transducer heads 218 during a write operation and a preamplifier for amplifying read signals generated by the transducer head 218 during a read operation. The signals generated by the transducer head 218 during the read operation are processed by a read signal processing module 244.

In one implementation, the disc drive circuit module 240 also includes baseline signal noise detection and rejection modules. The disc drive circuit module 240 may also include a selector switch (not shown) that routes the signal received from the transducer head 218 to the baseline signal noise detection and rejection modules when the transducer heads are off the ramp and to the read signal processing module 244 when the transducer head 218 is reading signals from the media surface of the disc drive.

Specifically, the baseline signal noise detection and rejection modules include a pre-amplifier module 250 for amplifying the baseline signal noise generated by the transducer heads 218 when the transducer head 218 is in a non-data zone such as off the ramp. The amplified baseline signal noise is input to a baseline signal noise characterization module 252 that characterizes the baseline signal noise. In one implementation, the baseline signal noise characterization module 252 determines the frequency of the baseline signal noise. For example, the baseline signal noise characterization module 252 may use an FFT circuit that determines the frequency of the baseline signal noise. A detailed description of the functioning of the baseline signal noise characterization module 252 is illustrated below in FIG. 2. In one implementation, the output of the baseline signal noise characterization module 252 is converted to a value using an analog to digital converter (ADC). In such a case, the output of the ADC provides values that represent the frequency of frequency band of the baseline signal noise. Such values are stored in one or more registers, etc., such that they can be used later for processing of signal read from the media surface of the disc drive 200.

The signal output from the baseline signal noise characterization module 252 is input to a signal rejection module 254. For example, the signal rejection module 254 may be a band rejection filter that is controlled by the output of the baseline signal noise characterization module 252. The signal rejection module 254 may also receive the read signals from the read signal processing module 244 during operation of the disc drive 200.

Thus, for example, if the baseline signal noise characterization module 252 determines that the baseline signal noise is represented substantially by a frequency band of 90-95 MHz, the signal rejection module 254 may filter the signal from the media surface of the disc drive 200 to remove the signal in this frequency band. As a result, the output of the signal rejection module 254 is substantially without any baseline signal noise.

Figure 3:
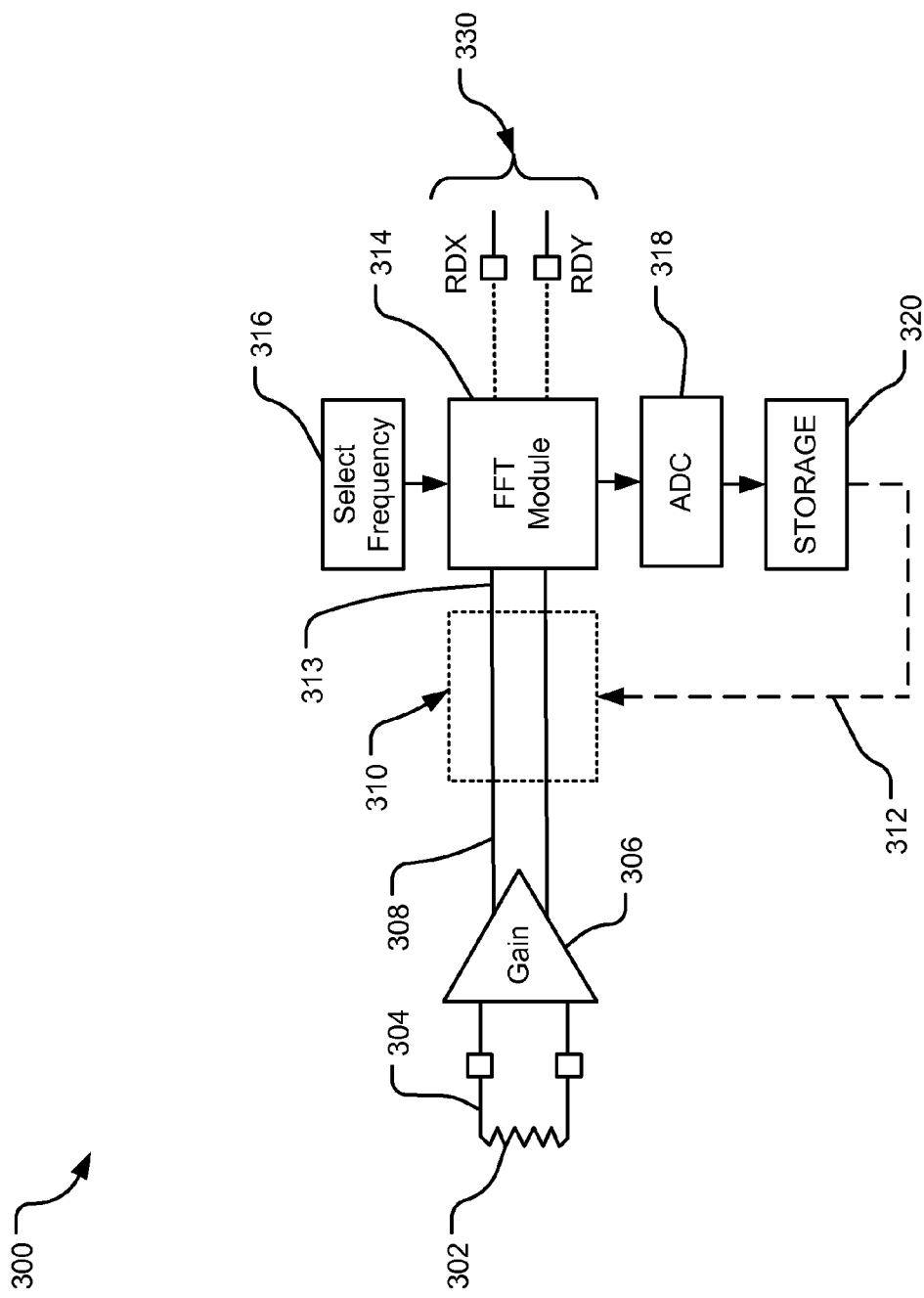
FIG. 3 illustrates an example block diagram of a circuit used for detecting baseline signal noise.

FIG. 3 illustrates an example block diagram of a circuit 300 used for detecting baseline signal noise. The circuit 300 includes a read sensor 302 on a transducer head that generates a signal that is substantially in proportion to information recorded on a media surface of a disc drive. For example, such information may include a position information, data, etc. The read sensor 302 may be a sensor stack where the resistance of the sensor stack changes based on the information recorded on a media surface. Thus, a sensor output signal 304 generated by the read sensor 302 may be in form of voltage across the sensor stack.

The sensor output signal 304 is input to a read amplifier 306 that amplifies the sensor output signal 304. An amplified read sensor signal 308 output from the amplifier 306 is input to an optional band rejection filter 310. The band rejection filter 310 is configured to reject signal for a frequency band based on a rejection band input signal 312. In one implementation of the circuit 300, the circuit 300 is operated with the transducer head including the read sensor 302 residing on a non-data zone such as a ramp of the disc drive. During such operation, the band rejection filter 308 may be bypassed such that the amplified read sensor signal 308 is not filtered. Because the read sensor 302 is on a non-data zone, the sensor output signal 304 generated by the read sensor 302 represents the baseline signal noise (including BLP, BLN, and other noise signals in absence of signal from the media). Alternatively, the amplified read sensor signal 308 is input through the band rejection filter 310, however, in this case, the band rejection filter 310 is configured to pass through the amplified read sensor signal 308 without any filtering. As a result, unfiltered baseline signal noise is output from the band rejection filter 310.

The unfiltered output signal 313 of the band rejection filter 310 or the amplified read sensor signal 308 is input to an FFT module 314. The FFT module 314 may also receive input signals at various selected frequencies from a frequency selection module 316. In one implementation, the frequency selection module 316 may be implemented using a 16 bit register to generate a series of frequency values. Generally, baseline signal noise is substantially in the range of 90 MHz to 100 MHz. Thus, in one implementation, the frequency selection module 316 may sequentially select frequencies in the frequency band of 90 MHz to 100 MHz and input such signals to the FFT module 314. The FFT module evaluates the amplitude of the signal input from the band rejection filter 310 (or the amplified read sensor signal 308) at various frequencies selected by the frequency selection module 316.

The output signal of the FFT module 314 representing amplitudes at various frequencies is input to an analog to digital converter (ADC) module 318. The ADC module 318 converts the output amplitude values into digital values, which is stored in a storage module 320. The storage module 320 may be, for example, registers on the disc drive controller, random access memory (RAM) cells on the disc drive controller, etc. While the circuit 300 illustrates an output from the storage module 320 as being used as the rejection band input signal 312, when the read sensor 302 is on the non-data zone of the disc drive, such input to the band pass filter module 310 may be disabled. The amplified read sensor signal 308 is also output to terminals 330.

Figure 4:
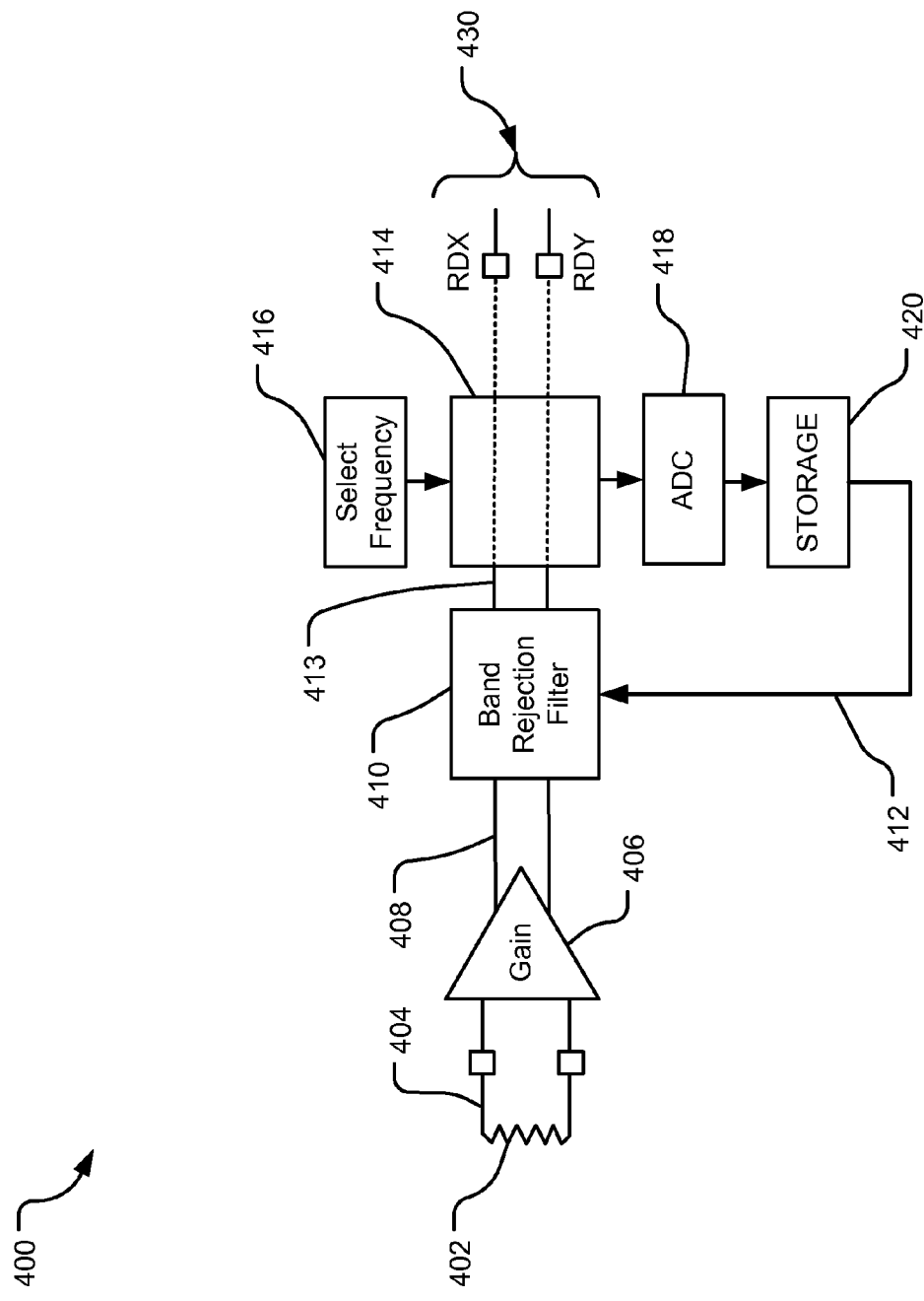
FIG. 4 illustrates an example block diagram of a circuit used for rejecting baseline signal noise.

FIG. 4 illustrates an example block diagram of a circuit 400 used for rejecting baseline signal noise. The circuit 400 includes a read sensor 402 on a transducer head that generates a signal that is substantially in proportion to information recorded on a media surface of a disc drive. For example, such information may include a position information, data, etc. The read sensor 402 may be a sensor stack where the resistance of the sensor stack changes based on the information recorded on a media surface. Thus, a sensor output signal 404 generated by the read sensor 402 may be in form of voltage across the sensor stack.

The sensor output signal 404 is input to a read amplifier 406 that amplifies the sensor output signal 404. An amplified read sensor signal 408 output from the amplifier 406 is input to a band rejection filter 410. The band rejection filter 408 is configured to reject signal for a frequency band based on a rejection band input signal 412. In one implementation of the circuit 400, the circuit 400 is operated with the transducer head including the read sensor 402 reading data from the media surface of the disc drive, such as position information, data, etc. During such operation, the band rejection filter 408 may receive the value of the frequency band representing the baseline signal noise as the rejection band input signal 412. For example, values of the frequency band for such baseline signal noise (including BLP, BLN, and other noise signals in absence of signal from the media) may be stored in a storage module 420.

The filtered output signal 413 of the band rejection filter 410 is bypass around an FFT module 414. As a result the filtered output signal 413 is output to terminals 430. Thus, for example, if the storage module 420 stores values for frequencies between, for example, 90 MHz and 95 MHz as representing the frequency band for the baseline signal noise, the filtered output signal 413 will not include any signal in such frequency band. Because the circuit 430 is operated in the baseline signal noise rejection mode, the frequency selection module 416 and the ADC 418 are not active.

Figure 5:
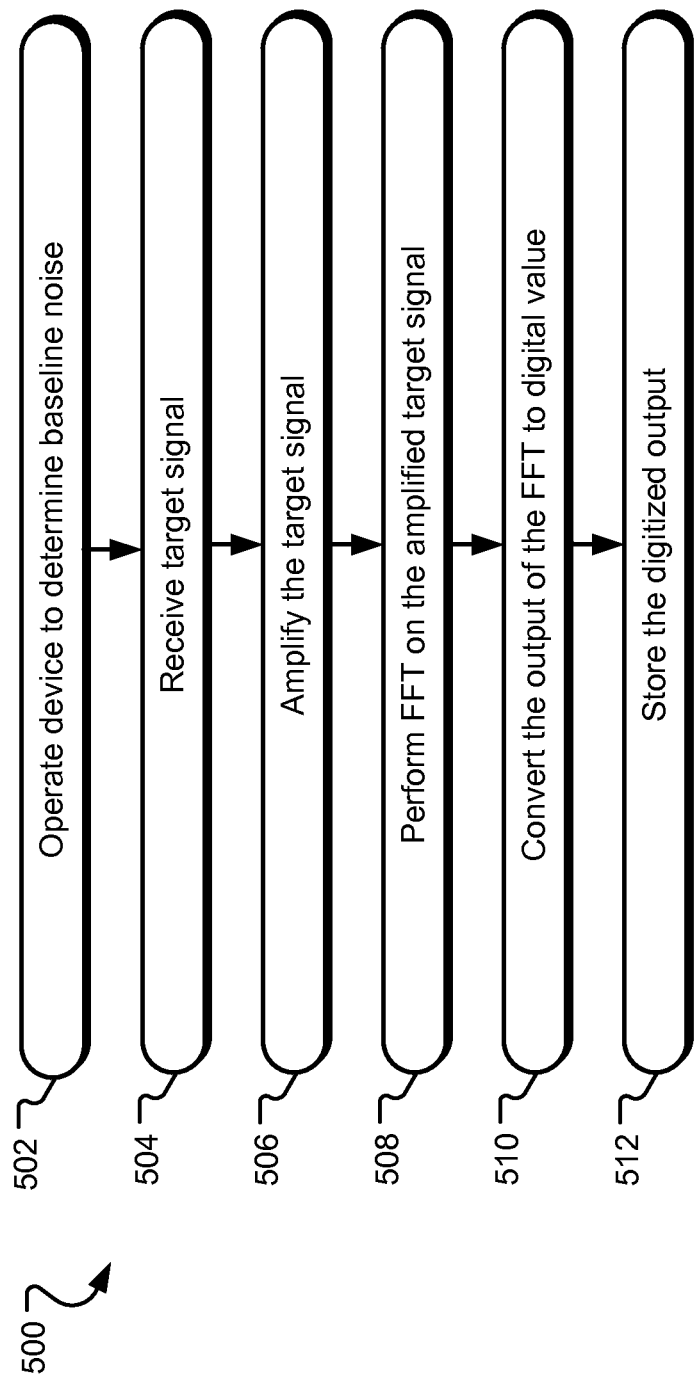
FIG. 5 illustrates an example flowchart of a method of detecting baseline signal noise.

FIG. 5 illustrates an example flowchart 500 of a method of detecting baseline signal noise. An operation 502 operates a device to determine baseline noise in a target signal. For example, the operation 502 operates a disc drive to determine baseline signal noise in a read sensor signal. As a result, the sensor signal generated by a read sensor on the transducer head represents that baseline signal noise for the read sensor. An operation 504 receives such target signal from the read sensor, such as a voltage signal between terminals attached to a sensor stack. An amplifying operation 506 amplifies the target signal. An analyzing operation 508 performs an FFT operation on the amplified target signal. The FFT operation determines the frequency domain form of the target signal to determine amplitudes at various frequencies. For example, frequency values having amplitudes above a threshold amplitude are determined to represent the baseline signal noise frequencies. An operation 510 converts the frequency values to digital values and a storing operation 512 stores these values.

Figure 6:
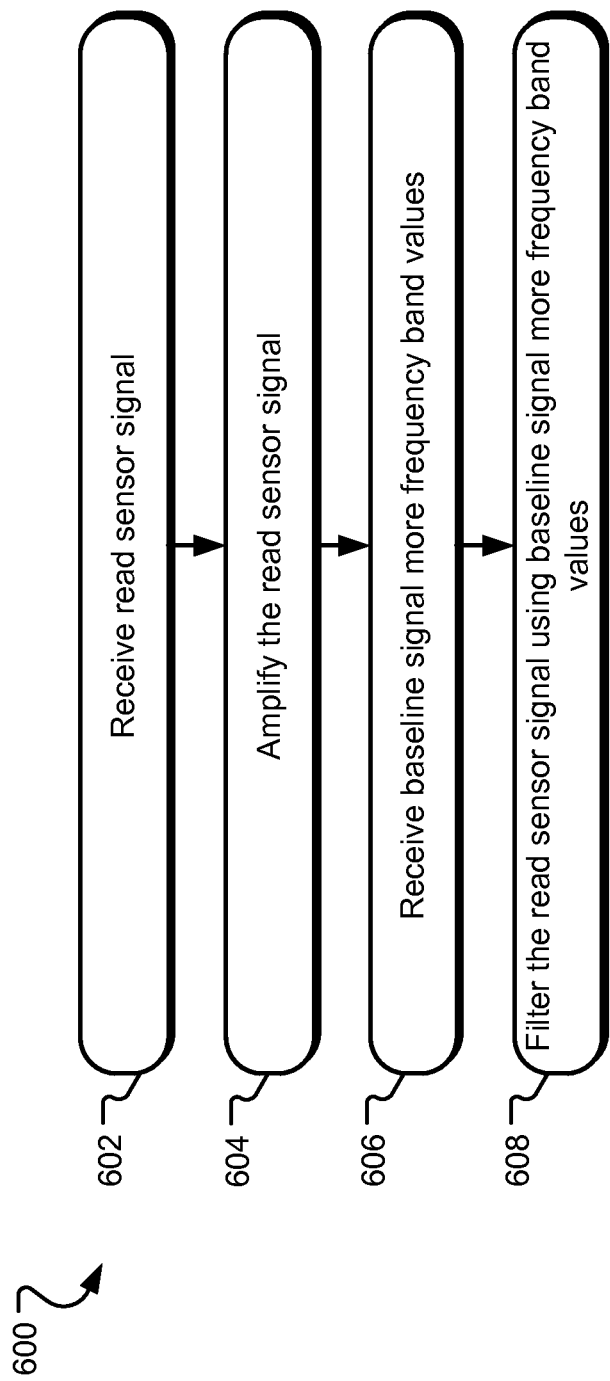
FIG. 6 illustrates an example flowchart of a method of rejecting baseline signal noise.

FIG. 6 illustrates an example flowchart 600 of a method of rejecting baseline signal noise. An operation 602 receives such signal from the read sensor, such as a voltage signal between terminals attached to a sensor stack. An amplifying operation 604 amplifies the sensor signal. The amplified sensor signal is input to a band rejection filter where the band rejection filter receives baseline signal noise frequency band values at an operation 606. At an operation 608, the band rejection filter uses the baseline signal noise frequency band values to reject sensor signal in the baseline signal noise frequency band.

Figure 7:
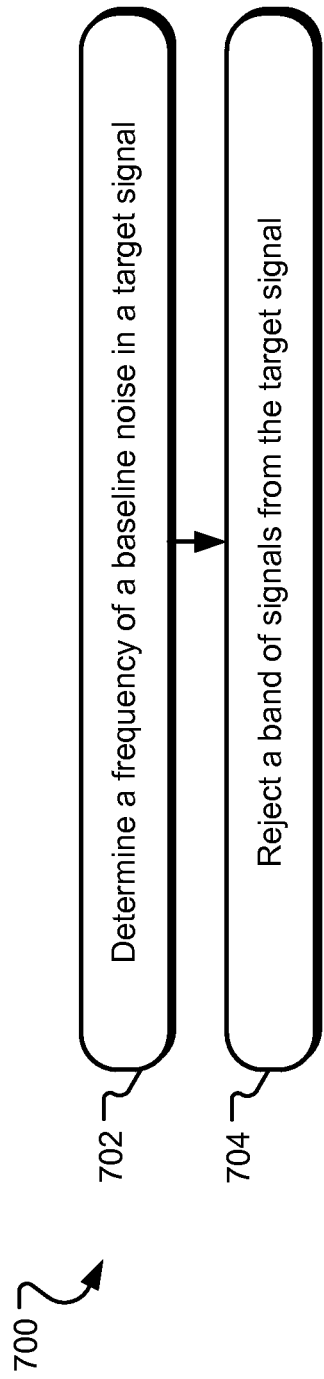
FIG. 7 illustrates an alternative example flowchart of a method of rejecting baseline signal noise from a target signal.

FIG. 7 illustrates an alternative example flowchart 700 of a method of rejecting baseline signal noise from a target signal. Foe example, the target signal may be signal generated from a device having a noise with a broadband spectrum. Specifically, the noise may have a number of notches at various frequencies with one of such notch being for the baseline noise. An example of a device having noise with a broadband nature is a disc drive where the head noise generated by the disc drive has a broadband nature. An operation 702 determines a frequency of a baseline noise in a target signal. Subsequently, an operation 704 rejects a band of signals from the target signal. For example, the operation 704 may reject a band of signals from the target signal substantially around the frequency of the baseline noise.

Although the block diagrams and flowcharts disclosed herein describe various embodiments in the context of storage devices for purposes of illustration and explanation, it is to be understood that the technology disclosed herein can be more broadly used for any type of servo control loop that can be subject to vibration.

In one implementation, the block diagrams and flowcharts disclosed above are implemented in hardware and/or in software (including firmware, resident software, micro-code, etc.). Furthermore, various implementations may take the form of a computer program product on a computer-usable or computer-readable storage medium having computer-usable or computer-readable program code embodied in the medium for use by or in connection with an instruction execution system. Accordingly, as used herein, the term "circuit" may take the form of digital circuitry, such as processor circuitry (e.g., general-purpose microprocessor and/or digital signal processor) that executes program code, and/or analog circuitry.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method comprising:
   determining a frequency of baseline noise in a target signal; and
   rejecting a band of signals from the target signal substantially around the frequency of the baseline noise by controlling a band-pass digitized value of the frequency of the baseline noise.

2. The method of claim 1, wherein determining a frequency of baseline noise further comprises performing a fast fourier transform (FFT) operation on the baseline noise.

3. The method of claim 2, wherein performing the FFT operation further comprising:
   selecting a plurality of frequencies within a frequency range of 90 MHz and 100 MHz using a frequency selection module; and
   analyzing an amplitude of the baseline noise at one or more of the plurality of frequencies.

4. The method of claim 1, wherein the target signal is a read sensor signal.

5. The method of claim 1, wherein determining a frequency of baseline noise further comprising:
   storing the digitized value of the frequency of the baseline noise.

6. The method of claim 1, wherein the method further comprises:
   positioning a read sensor head on a non-data zone of a disc drive; and
   receiving the target signal from the read sensor head.

7. The method of claim 6, wherein the non-data zone is an off disc ramp.

8. The method of claim 5, wherein the method further comprises:
   filtering the target signal using the digitized value of the frequency of the baseline noise.

9. The method of claim 2, further comprising:
   generating a plurality of frequency values using a 16 bit register; and
   using the plurality of frequency values to perform the FFT operation.

10. A device, comprising:
    a baseline noise frequency detector configured to determine a baseline frequency of a reader baseline noise; and
    a band rejection filter configured to reject the baseline noise from a read sensor signal by controlling a band-pass rejecting filter for rejecting a band of signals using a digitized value of the baseline frequency of the reader baseline noise.

11. The device of claim 10, wherein the baseline noise frequency detector is an FFT analyzer.

12. The device of claim 11, further comprising a 16 bit register configured to generate a range of frequencies input to the FFT analyzer.

13. The device of claim 11, further comprising a storage module to store the output of the FFT analyzer.

14. The device of claim 11, wherein the band rejection filter is controlled by the output of the FFT analyzer.

15. The device of claim 11, wherein the baseline noise frequency detector is further configured to detect a frequency band for the reader baseline noise.

16. The device of claim 10, wherein the baselines noise frequency detector is further configured to:
    store the digitized value of the baseline frequency in a storage module.

17. A method, comprising:
    determining a frequency of a baseline noise in a target signal;
    converting the frequency of the baseline noise into a digitized frequency value; and
    rejecting the baseline noise from the target signal by controlling a band rejection filter using the digitized frequency value.

18. The method of claim 17 further comprising:
    converting the frequency into a digitized frequency value; and
    storing the digitized frequency in a storage module.

* * * * *